(12) United States Patent
Dionysian et al.

(10) Patent No.: US 6,796,753 B2
(45) Date of Patent: Sep. 28, 2004

(54) TOOLING ACCESSORY FOR HAND DRILLING

(76) Inventors: Ara Dionysian, 12550 Allin St., Los Angeles, CA (US) 90066-6718; Raffi Dionysian, 12550 Allin St., Los Angeles, CA (US) 90066-6718

( * ) Notice: Subject to any disclaimer, the term of this patent is extended or adjusted under 35 U.S.C. 154(b) by 0 days.

(21) Appl. No.: 10/391,500

(22) Filed: Mar. 17, 2003

(65) Prior Publication Data

US 2004/0022593 A1 Feb. 5, 2004

Related U.S. Application Data

(63) Continuation-in-part of application No. 10/211,095, filed on Aug. 2, 2002, now abandoned.

(51) Int. Cl.$^7$ .............................................. B23B 35/00
(52) U.S. Cl. ................... 408/1 R; 408/110; 408/241 S; 408/712
(58) Field of Search ................................ 408/1 R, 110, 408/111, 112, 712, 14, 16, 241 S; 173/170

(56) References Cited

U.S. PATENT DOCUMENTS

| | | | | |
|---|---|---|---|---|
| 2,831,376 A | * | 4/1958 | Daniels | 408/16 |
| 2,888,965 A | | 6/1959 | Phillips | 144/1 |
| 2,953,045 A | * | 9/1960 | Carles | 408/110 |
| 3,046,817 A | | 7/1962 | Schwable | 77/7 |
| 3,119,286 A | * | 1/1964 | Forman et al. | 408/110 |
| 3,141,360 A | | 7/1964 | Wolf | 77/7 |
| 3,746,460 A | * | 7/1973 | Lipe | 408/112 |
| 3,827,822 A | | 8/1974 | Converse | 408/110 |
| 3,874,810 A | | 4/1975 | Russell | 408/14 |
| 4,080,092 A | | 3/1978 | Hudson | 408/110 |
| 4,277,208 A | * | 7/1981 | Jackson et al. | 408/14 |
| 4,314,782 A | * | 2/1982 | Beekenkamp | 408/16 |
| 4,729,698 A | * | 3/1988 | Haddon | 408/110 |
| 4,810,137 A | | 3/1989 | Yang | 408/100 |
| 4,923,341 A | * | 5/1990 | Cameron | 408/112 |
| 5,006,022 A | | 4/1991 | Miller | 408/16 |
| 5,147,162 A | | 9/1992 | Capotosto et al. | 408/110 |
| 5,160,231 A | | 11/1992 | Miller | 408/135 |
| 5,713,702 A | | 2/1998 | Turner | 408/88 |
| 6,386,802 B1 | * | 5/2002 | Negri et al. | 408/1 R |

* cited by examiner

Primary Examiner—Daniel W. Howell
(74) Attorney, Agent, or Firm—Cislo Thomas LLP

(57) ABSTRACT

A tooling accessory for use with a slightly modified hand drill to produce accurate holes includes a base plate with a central opening having a vertical member arising at 90 degrees from the perimeter of the base plate. A body of a conventional hand drill is modified by attaching one or more protruding members. Once the protruding members engage the vertical member, then the hand drill may be moved towards the base plate in a controlled manner, thereby producing a perpendicular hole. Additionally, a stop may be provided in the vertical member to control the distance the modified hand drill moves towards the surface to be drilled, thereby controlling the depth of the hole. The tooling accessory may be used to produce accurate holes in a large wall-like surfaces, or alternatively may be used to drill a small workpiece.

11 Claims, 7 Drawing Sheets

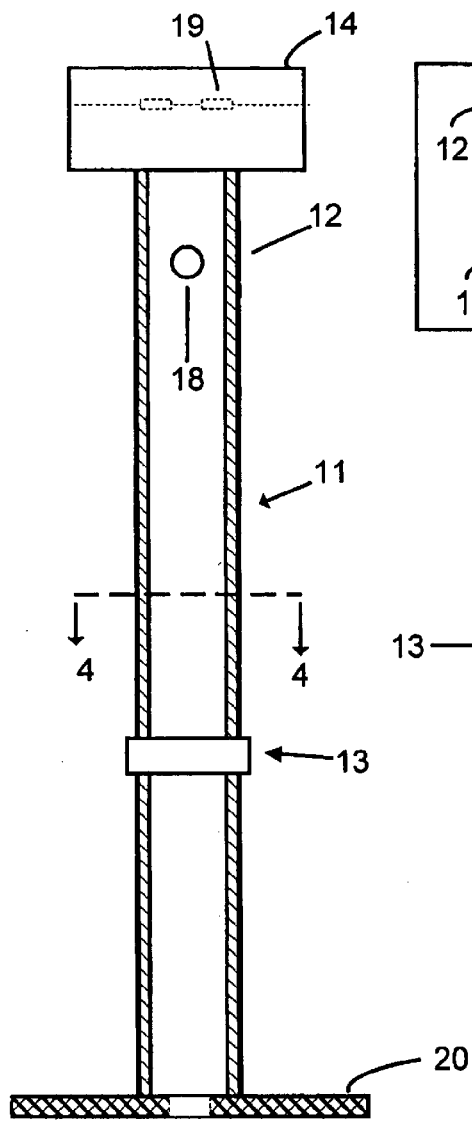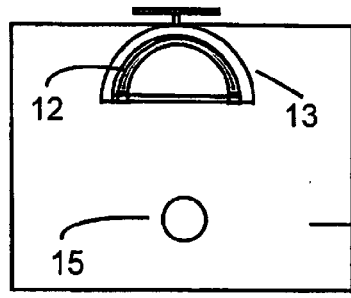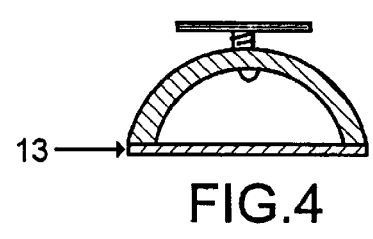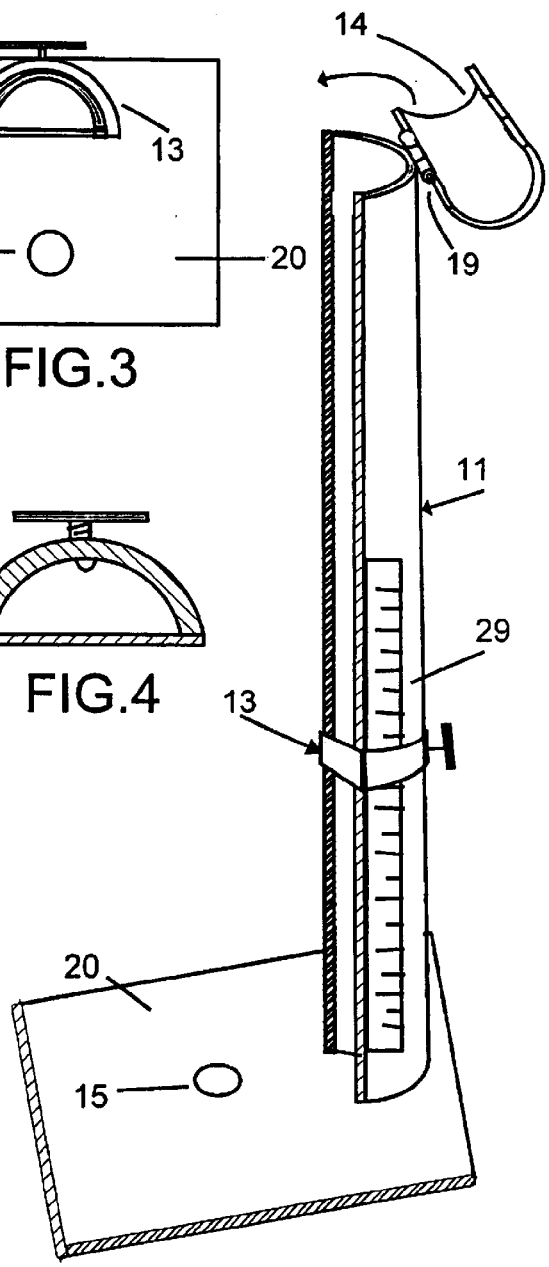
FIG.3
FIG.4
FIG.2
FIG.1

TOOLING ACCESSORY FOR HAND DRILLING

CROSS-REFERENCE TO RELATED APPLICATIONS

This patent application is a continuation-in-part to U.S. patent application Ser. No. 10/211,095 filed Aug. 2, 2002 now abandoned.

BACKGROUND OF THE INVENTION

1. Field of the Invention

The present invention relates generally to portable machine tools and accessories therefor, and more particularly to a specially-configured hand drill and corresponding combination stand and guide to ensure material removal at a precise angle and to a precise depth.

2. Description of the Related Art

Upright floor or bench mounted drilling machines or drill presses have long solved the problem of accurately drilling a hole in an object, including perpendicular to a surface and to a certain depth. If a work piece or large object cannot be placed under a shop or workbench drill press, however, the only practical way to drill a hole is using a portable drill motor or hand drill. When using such a hand drill it is difficult to drill a perpendicular hole to a precise depth.

Although the archives of the Patent Office contain many issued patents attempting to solve this problem, very few are viable solutions in today's marketplace. This is because, in part, household handymen are unwilling to pay more than perhaps ten percent of the price of a hand drill for an accessory to provide perpendicular drilling and depth control. The inventors listed below have attempted to overcome the above-identified problem with little success.

| U.S. Pat. No. | Inventor | Issue Date |
| --- | --- | --- |
| 2,888,965 | Phillips | Jun. 2, 1959 |
| 3,046,817 | Schwable | Sep. 12, 1962 |
| 3,141,360 | Wolf | Jul. 21, 1964 |
| 3,827,822 | Converse | Aug. 6, 1974 |
| 3,874,810 | Russell | Apr. 1, 1975 |
| 4,080,092 | Hudson | Mar. 21, 1978 |
| 4,494,895 | Leaf | Jan. 22, 1985 |
| 4,810,137 | Yang | Mar. 7, 1989 |
| 5,006,022 | Miller | Apr. 9, 1991 |
| 5,147,162 | Capotosto et al. | Sep. 15, 1992 |
| 5,150,993 | Miller | Sep. 29, 1992 |
| 5,160,231 | Miller | Nov. 3, 1992 |
| 5,713,702 | Turner | Feb. 3, 1998 |

Other disadvantages associated with the prior art include that the proposed devices are too heavy and bulky and thus not truly portable (e.g. the Turner '702 patent). In most other instances the prior art devices fail to include a sufficient bearing surface against which to place the object to be drilled, and fail to locate the bearing surface sufficiently proximate the hole to be drilled (e.g. the Converse '822 and Miller '022 patents). These and other disadvantages associated with the prior art are believed overcome by the present invention.

SUMMARY OF THE INVENTION

Accordingly, a primary object of the present invention is to provide a lightweight and inexpensive tooling accessory adaptable to conventional hand-held portable drill motors, to enable perpendicular holes of controlled depth to be reliably and repeatedly produced around the house, on surfaces which cannot conveniently or easily be transported to a drill press. Also an object of the invention is to provide a versatile accessory that can be used to assist in accurately drilling into large, e.g. wall, surfaces as well as small objects.

In accordance with the present invention, disclosed is a portable, combination stand and guide for use with a hand drill having a modified body. The combination stand and guide includes a substantially flat base plate having a central opening, and a vertical member arising out of and perpendicular to the perimeter of the base plate. The vertical member has a curved cross-section sized to slidably engage corresponding curved slots in the modified body of the hand drill. The vertical member preferably has a stop located a variable distance from the base plate, and has markings indicative of that distance. The stop prevents further than desired movement of the hand drill towards the base plate. The base plate and vertical member are of preferably of one piece and fabricated of injection molded plastic.

Using the combination stand and guide and modified hand drill, the user may engage the vertical member with the hand drill, and the base plate may be placed against a surface to be drilled. Alternatively, a small object to be drilled may be placed on the base plate. Then the hand drill is slidably moved towards the base plate until the stop is reached, facilitating drilling of a perpendicular hole of a controlled depth. Optionally at the top of the vertical member is a cover that when folded down serves as a convenient handle to hold the device up against a large surface when desired.

Still in accordance with the invention, alternatively the vertical member may have a slotted cross-section sized to slidably engage a corresponding protruding bracket fixedly mounted to the body of the conventional hand drill. Preferably, the protruding bracket is of a t-shaped cross section. The protruding bracket may be mounted to the top or the sides of the body of the conventional hand drill.

Further still in accordance with the invention, there is a kit to convert a conventional hand drill into one, along with a tooling accessory, offering the capability of producing perpendicular holes of controlled depth. The kit includes the base plate and vertical member as described above, and the protruding member attachable to the body of the conventional hand drill and sized to slidably engage the vertical member. Again, there is a stop located along the vertical member a variable distance away from the base plate and markings indicative of that distance.

Additionally disclosed herein are methods in accordance with the present invention. A method of accurately producing holes with a hand drill includes the steps of: providing a tooling accessory consisting of a base plate in combination with a perpendicular vertical member; attaching a protruding member to the body of a conventional hand drill; slidably engaging the protruding member with the vertical member; placing the base plate against a large surface to be drilled; and sliding the hand drill along the vertical member while drilling through an opening in the base plate into the object to be drilled. Preferably, the user adds the opening in the base plate the first time the tooling accessory is used. The method can also be used to accurately drill holes in small workpieces placed on top of the base plate. The method may further include the step of setting a stop along the vertical member to control the depth of drilling.

Alternatively described, a method of converting a conventional hand drill into a modified hand drill for use along with a tooling accessory for accurately producing holes includes the steps of: providing the tooling accessory described above including a stop; attaching a protruding member to the body of a conventional hand drill; slidably engaging the protruding member with the vertical member; and drilling an opening in the base plate the first time the tooling accessory is used. Then by placing the base plate against a large surface to be drilled, and sliding the hand drill along the vertical member while drilling through the opening in the base plate into the object to be drilled until the stop is reached, accurate holes can be hand drilled.

These and other advantages of the present invention will become evident from the appended drawings and detailed descriptions of the preferred embodiments which follow.

BRIEF DESCRIPTION OF THE DRAWINGS

FIG. 1 is a perspective view of a tooling accessory of a first preferred embodiment of the present invention.

FIG. 2 is a front view of the tooling accessory of FIG. 1.

FIG. 3 is a top view of the tooling accessory of FIG. 1.

FIG. 4 is a section view of the tooling accessory taken through the stop where indicated.

LISTING OF REFERENCE NUMERALS

Figures 5, 6:
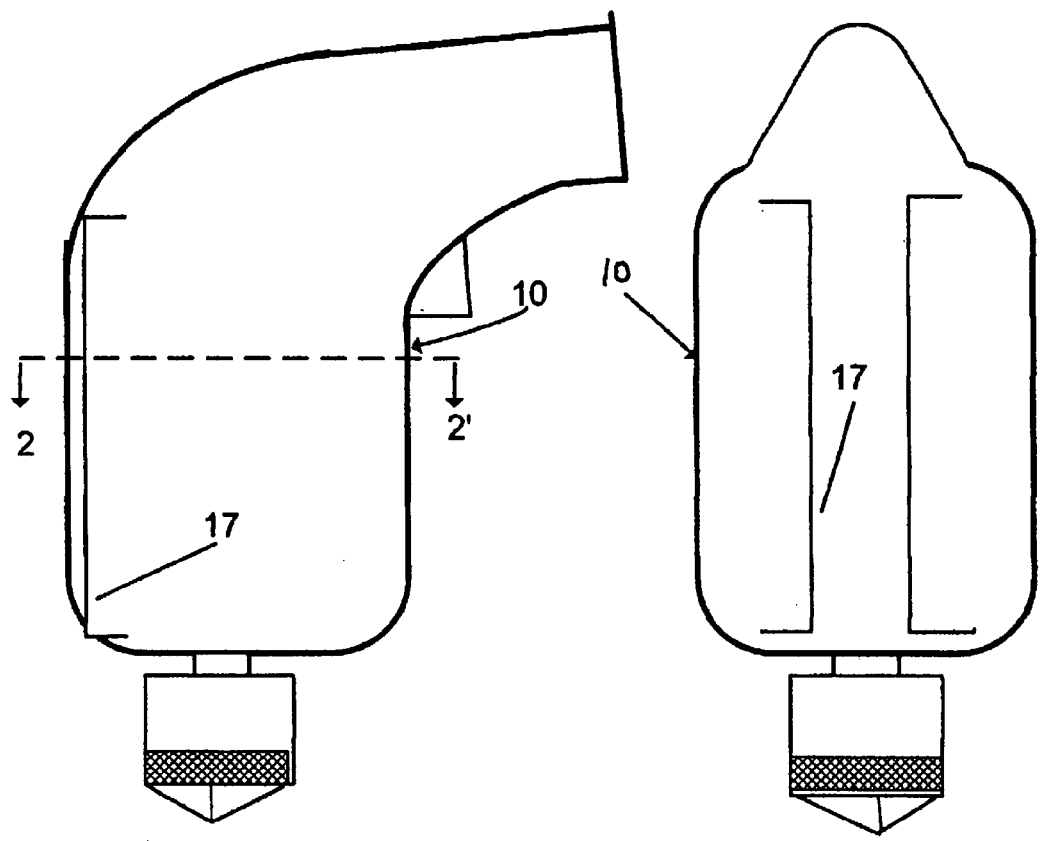
FIG. 5 is a side view of a conventional hand drill motor modified as shown.
FIG. 6 is a top view of the hand drill of FIG. 5.

| hand drill | 10 |
| alternate hand drill | 10' |
| tooling accessory | 11 |
| alternate tooling accessory | 11' |
| vertical member | 12 |
| adjustable stop | 13 |
| alternate adjustable stop | 13' |
| foldable cover | 14 |
| opening | 15 |
| slotted cross-section | 16 |
| protruding members | 17 |
| hole for hanging | 18 |
| conventional hinge | 19 |
| base plate | 20 |
| slot | 25 |
| vertical member | 27 |
| drilled hole | 28 |
| distance measuring scale | 29 |
| workpiece | 30 |
| upstand web | 31 |
| upstand web | 32 |
| protruding member | 33 |
| fastener | 34 |
| fastener | 35 |
| protruding member | 36 |

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Referring first to drawing FIGS. 1–4, shown is a first preferred embodiment of the present invention, namely a tooling accessory 11 having a substantially flat base plate 20 with a central through hole or opening 15. Arising out of the perimeter of the base plate 20 at an angle of 90 degrees is a vertical member 12 having a substantially curved cross-section. Preferably on the vertical member 12 preferably has an adjustable stop 13 and markings resembling a distance-measuring scale 29. Additionally, in the vertical member 12 is a hole 18 (for hanging up the tooling accessory 11 on a hook or nail), and attached by a conventional hinge 19 is a foldable cover 14 having a smooth curved surface. The tooling accessory 11 is preferably fabricated of injection-molded plastic, or possibly aluminum or other lightweight metals.

Figure 7:
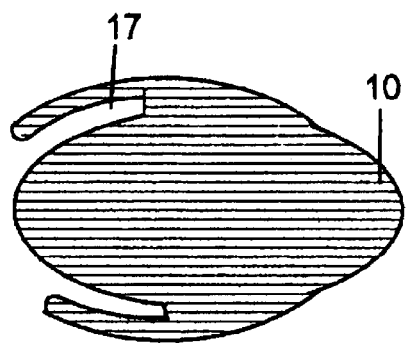
FIG. 7 is a section view of the hand drill taken through its body where indicated.
Figures 8, 9:
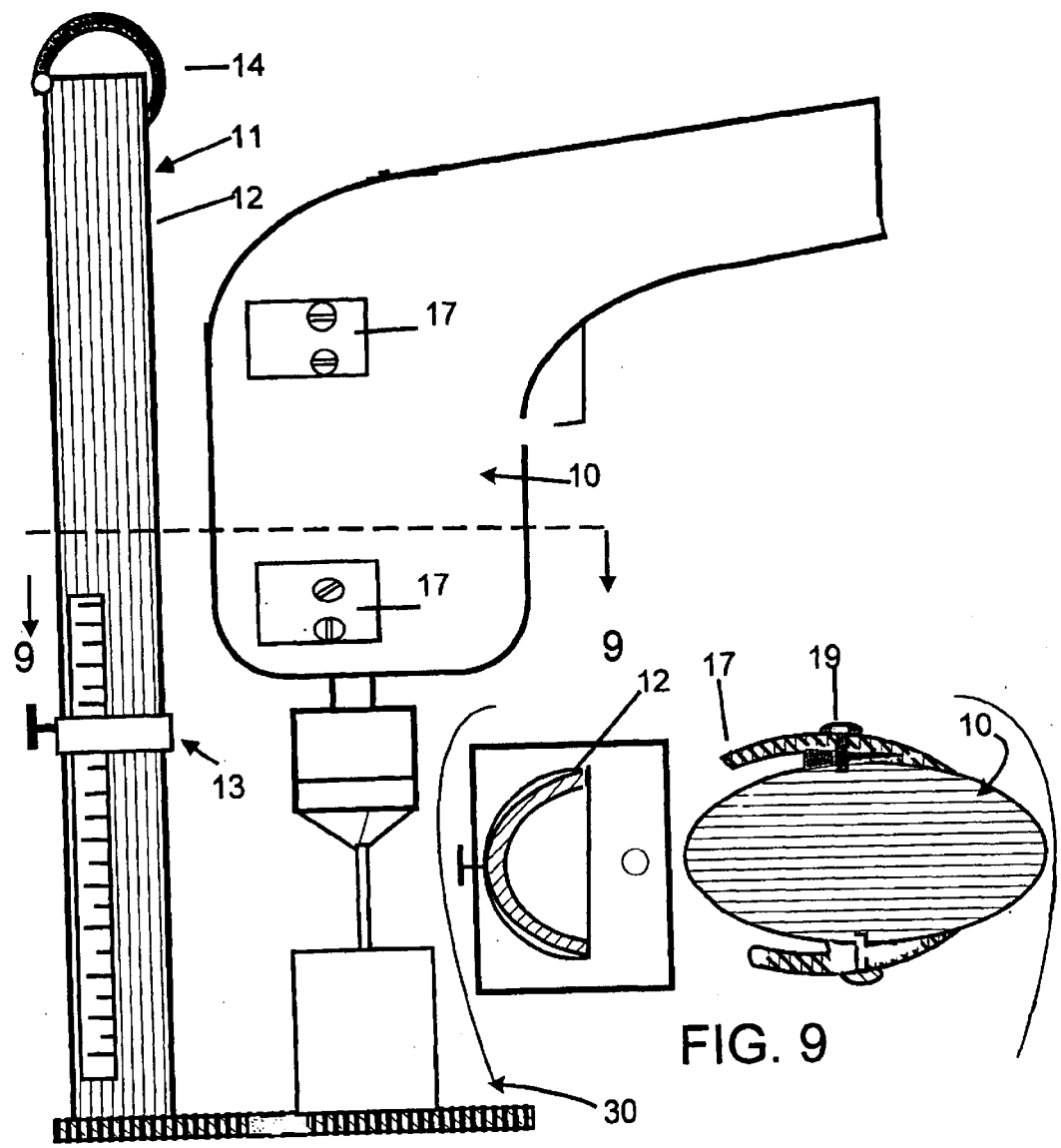
FIG. 8 is an exploded side view of the tooling accessory and modified hand drill.
FIG. 9 is a section view taken through the tooling accessory and hand drill where indicated.
Figures 10, 11:
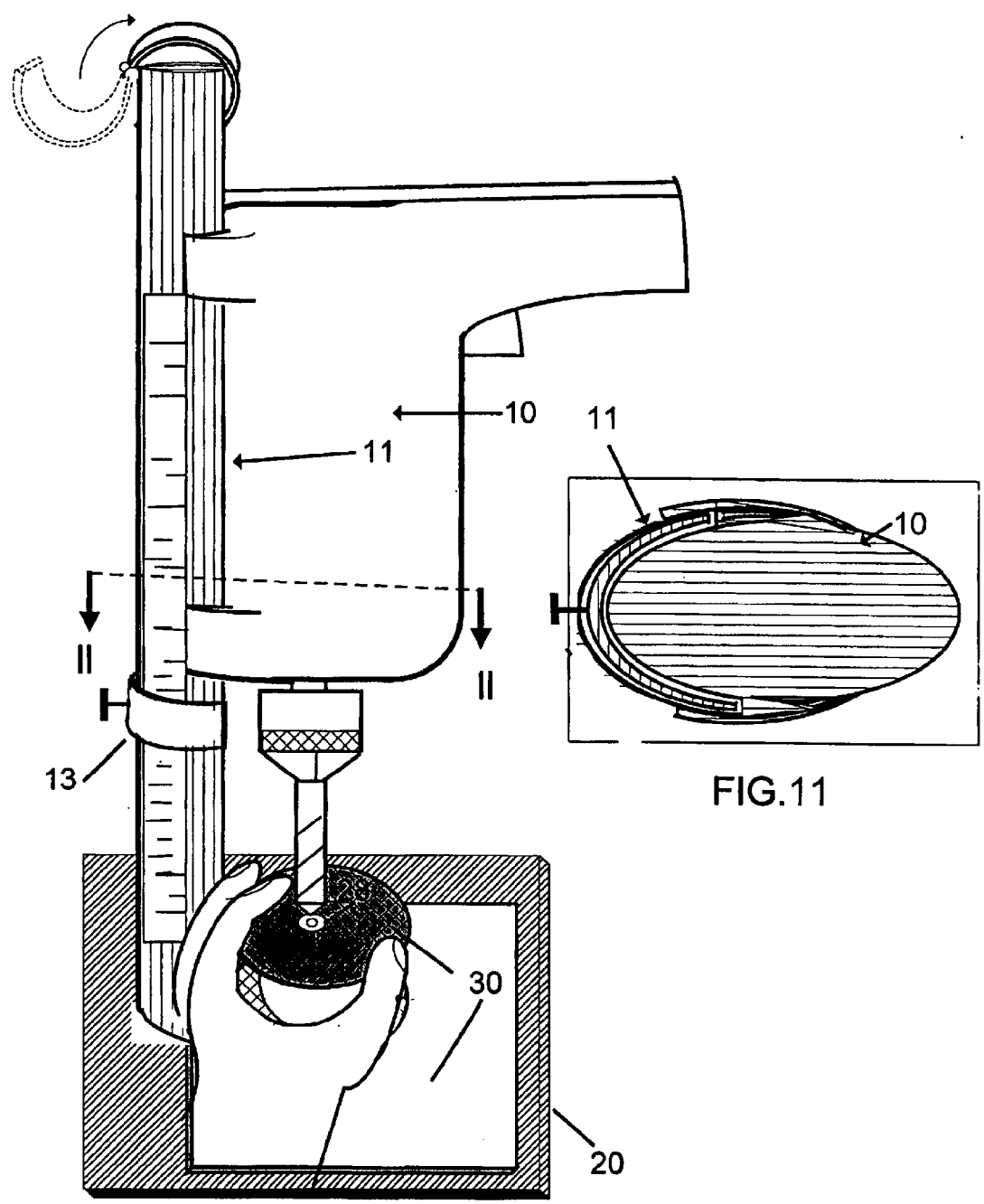
FIG. 10 is a perspective view of the tooling accessory and modified hand drill in use to drill a small object places on top of the base plate.
FIG. 11 is a section view taken through the tooling accessory and hand drill where indicated.
Figures 12, 13:
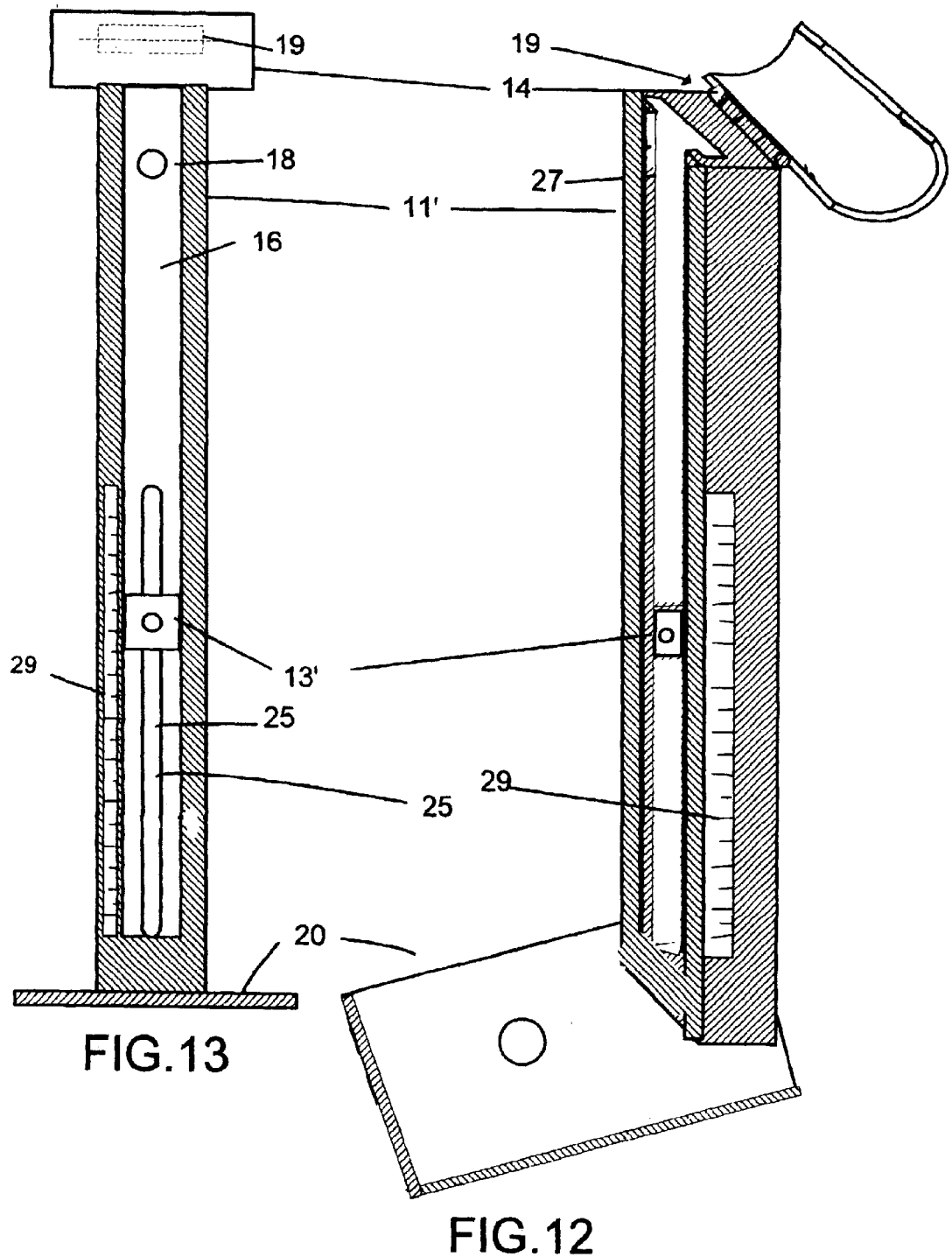
FIG. 12 is a perspective view of a tooling accessory of a second preferred embodiment of the present invention.
FIG. 13 is a front view of the tooling accessory of FIG. 12.
Figures 14, 15:
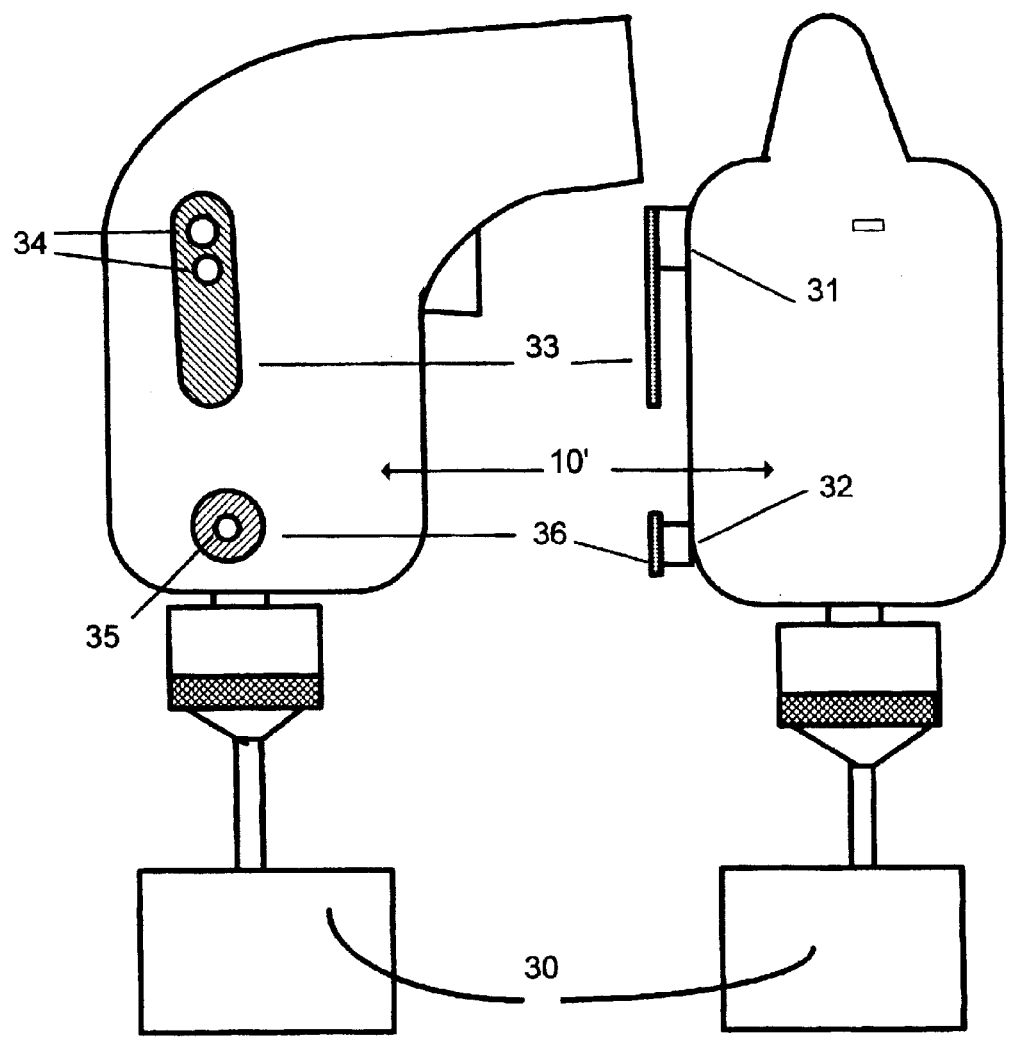
FIG. 14 is a side view of an alternate modified hand drill.
FIG. 15 is a top view of the hand drill of FIG. 14.
Figures 16, 17:
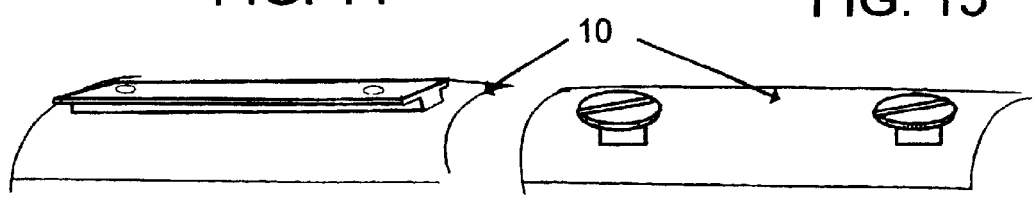
FIGS. 16 and 17 are perspective views of portions of the hand drill of FIGS. 14 and 15.
Figure 18:
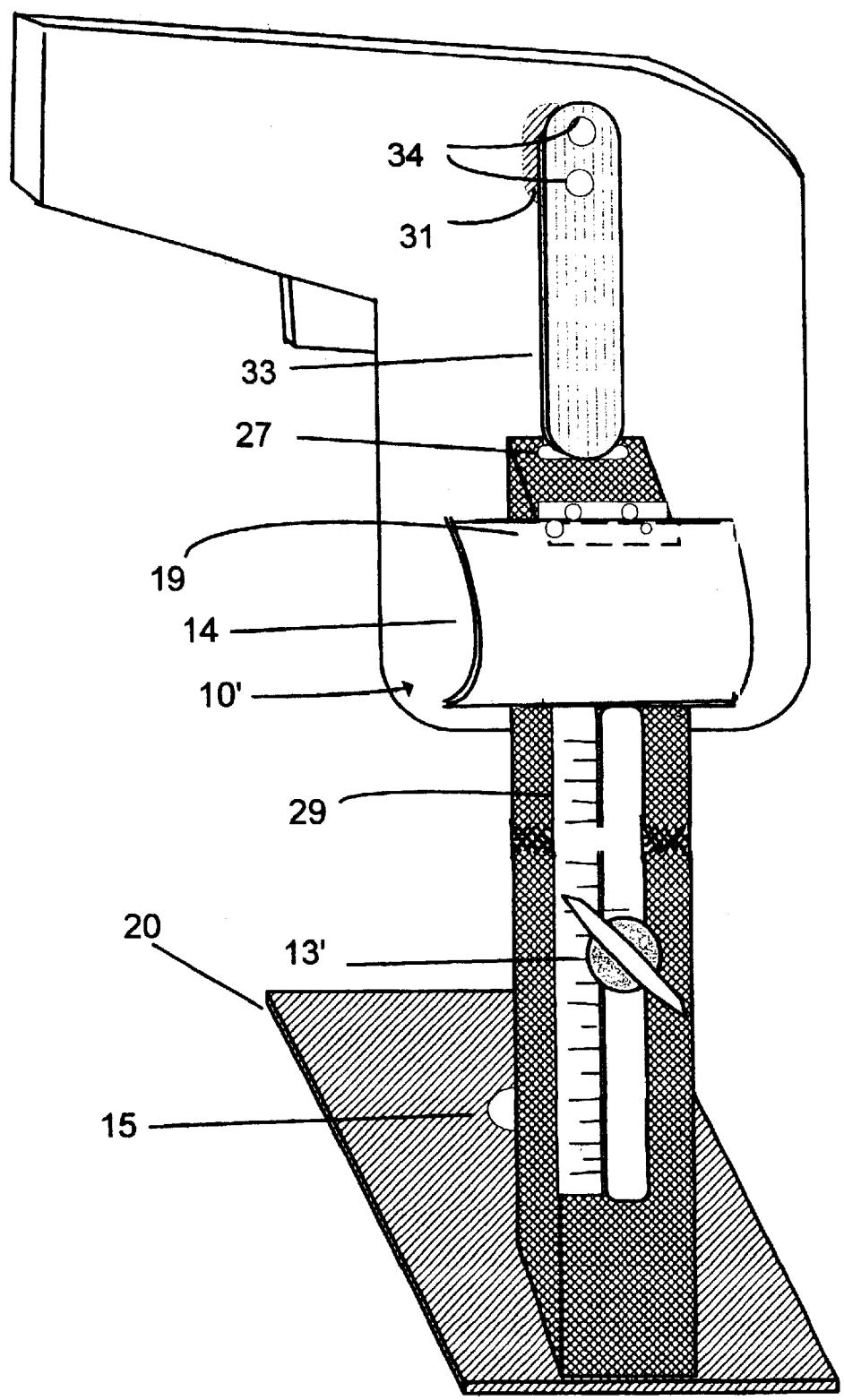
FIG. 18 is a perspective view of the tooling accessory and alternate modified hand drill of the second preferred embodiment in use to drill into a large surface under the base plate.

Next referring to FIGS. 5–7, shown is a conventional hand drill motor which has been modified for purposes of the present invention. The hand drill 10 includes a pair of protruding members 17 of a curved cross-section. These protruding members 17 are sized and configured to the vertical member 12 of the tooling accessory 11. The protruding members 17 are preferably held on by one or more fasteners 19, although they could be glued, strapped or otherwise attached. FIGS. 8–11 show the tooling accessory 11 and modified hand drill 10 in disassembled and assembled views for use in drilling a hole 28 in a small object or workpiece 30 placed on the top of the base plate 20.

Now referring to FIGS. 12–18, shown is a tooling accessory 11' of a second preferred embodiment of the present invention, as well as an alternate modified hand drill 10'. The tooling accessory 11' has a vertical member 27 of a slotted cross-section 16, and a stop 13' that rides therein on another slot 25. The alternate modified hand drill 10' includes one or more protruding members 33, 36 having t-shaped cross-sections including upstanding webs 31, 32 and held on by fasteners 34, 35.

Having described the structure of the preferred embodiments of the present invention, now their function, operation and use may be discussed. The invention may be sold as a tooling accessory 11 or 11' including a kit to modify a conventional hand drill motor. Protruding members 17 or 31, 33 are attached to the hand drill. Then the modified hand drill 10 or 10' is engaged with the vertical member 12 or 27. Preferably, rather than the base plate 20 being supplied with the opening 15, instead the opening 15 is drilled by the user the first time the tooling accessory 11 or 11' is used to drill a hole in a large surface such as a wall. That way, the opening 15 is correctly located for the particular conventional drill motor of the user.

When drilling a hole in a floor, wall or ceiling, the curved cover 14 is preferably folded down and provides a convenient handle for holding the bottom of the base plate 20 tooling against the wall. Besides using the tooling accessory 11 or 11' for drilling accurate holes in a large surface, it is versatile in that it may also be used to drill an accurate hole 28 in a small object or workpiece 30 by hand to stabilize the tool without any additional framework. This is done by placing the tooling accessory 11 or 11' on a table or other flat surface, and placing the workpiece 30 on top of the base plate 20. Optionally, however the tooling accessory 10 or 10' is used, the stop 13 or 13' can be positioned (with reference to the scale 29) to control the sliding distance of the hand drill 10 or 10', thereby controlling the depth of the hole to be drilled.

Use of the present invention helps a household handyman without access to sophisticated tooling produce a high-quality hand drilled hole that is perpendicular to and of controlled depth from the drilling surface. The tooling accessory 11 or 11' is inexpensive, lightweight, not bulky and versatile in its uses. The required modifications to the body of a conventional hand drill are minimal and easy. The unique combination of the present invention provides advantages not seen in the prior art.

What is claimed is:

1. A tooling accessory for use with a conventional hand drill having a modified body comprising:

a substantially flat base place having a central opening;

a vertical member arising out of and perpendicular to the perimeter of the base plate, the vertical member having a curved cross-section sized to slidably engage corresponding curved slots in the modified body of the hand drill; and, the vertical member having a stop located a variable distance from the base plate and having markings indicative of said distance, the stop preventing further movement of the hand drill towards the base plate;

whereby the hand drill may engage the vertical member and the base plate may contact a surface to be drilled, and the hand drill slidably moved towards the base plate until the stop is reached, facilitating drilling of a perpendicular hole of a controlled depth.

2. The tooling accessory of claim 1, wherein the base plate and vertical member are of one piece molded plastic.

3. The tooling accessory of claim 1, further comprising a curved foldable cover on the top end of the vertical member that when folded down serves as a convenient handle for holding the combination stand and guide against a large surface to be drilled.

4. A method of converting a conventional hand drill into a modified hand drill for use along with a cooling accessory for accurately producing holes in a surface comprising the steps of:

providing a tooling accessory consisting of a base plate in combination with a perpendicular vertical member having a stop;

attaching a protruding member to the body of a conventional hand drill;

slidably engaging the protruding member with the vertical member;

drilling an opening in the base plate the first time the tooling accessory is used;

whereby placing the base plate in contact with the surface to be drilled, and sliding the hand drill along the vertical member while drilling until the stop is reached, accurate holes can be hand drilled.

5. A tooling accessory for use with a conventional hand drill comprising:

a substantially flat base plate having a central opening;

a vertical member arising out of and perpendicular to the perimeter of the base plate, the vertical member having a slotted cross-section sized to slidably engage a corresponding protruding bracket fixedly mounted to the body of the conventional hand drill; and, the vertical member having a stop located a variable distance from the base plate and having markings indicative of said distance, the stop preventing further movement of the hand drill towards the base plate;

whereby the hand drill may engage the vertical member and the base plate may contact a surface to be drilled, and the hand drill slidably moved towards the base plate until the stop is reached, facilitating drilling of a perpendicular hole of a controlled depth, and wherein the base plate and vertical member are of one piece molded plastic.

6. The tooling accessory of claim 5, wherein the protruding bracket is of a generally t-shaped cross section.

7. A method of accurately producing holes with a band drill comprising the steps of:

providing a tooling accessory consisting of a base plate in combination with a perpendicular vertical member;

attaching a protruding member to the body of a conventional hand drill;

slidably engaging the protruding member with the vertical member;

drilling an opening in the base plate the first time the tooling accessory is used;

placing the bottom side of the base place in contact with a large surface to be drilled;

sliding the hand drill along the vertical member while drilling through the opening into the surface to be drilled.

8. The method of accurately producing holes with a hand drill of claim 7 further comprising the step of setting a stop along the vertical member to control the depth of drilling.

9. The method of accurately producing holes with a hand drill of claim 7 further comprising the steps of:

placing a small workpiece on the top side of the base plate;

sliding the hand drill along the vertical member while drilling into the workpiece to be drilled.

10. A kit to convert a conventional hand drill and a tooling accessory offering the capability of producing perpendicular holes of controlled depth comprising:

a substantially flat base plate, having a vertical member arising out of and perpendicular to the perimeter of the base plate, the vertical member having a cross-section;

a protruding member attachable to the body of the conventional hand drill and sized to slidably engage the corresponding cross-section of the vertical member; and, a stop located along the vertical member a variable distance away from the base plate and having markings indicative of said distance, the stop preventing further movement of the band drill towards the base plate;

whereby the band drill may engage the vertical member and the base plate may contact a surface to be drilled, and the hand drill slidably moved towards the base plate until the stop is reached, and wherein the base plate and vertical member are of one piece molded plastic.

11. The kit of claim 10, wherein the base plate is provided without an opening for drilling through as said opening in the baseplate is made by the user the first time the kit is used.

* * * * *